United States Patent
Blake et al.

(10) Patent No.: US 6,679,122 B2
(45) Date of Patent: Jan. 20, 2004

(54) PRESSURE GAUGE HAVING A DAMPENER MECHANISM WITH ATTACHABLE HOUSING

(75) Inventors: Jeffrey T. Blake, Milford, CT (US); William G. Muldowney, Milford, CT (US)

(73) Assignee: Dresser, Inc., Addison, TX (US)

( * ) Notice: Subject to any disclaimer, the term of this patent is extended or adjusted under 35 U.S.C. 154(b) by 0 days.

(21) Appl. No.: 09/821,623

(22) Filed: Mar. 29, 2001

(65) Prior Publication Data

US 2001/0045131 A1 Nov. 29, 2001

Related U.S. Application Data

(63) Continuation-in-part of application No. 09/589,377, filed on Jun. 7, 2000, which is a continuation-in-part of application No. 09/080,071, filed on May 15, 1998, now Pat. No. 6,119,525.

(51) Int. Cl.[7] .................................................. G01L 7/04
(52) U.S. Cl. ........................ 73/739; 73/700; 73/732; 73/741; 73/430; 73/514.12; 73/514.14
(58) Field of Search .................. 73/739, 741, 700, 73/707, 732

(56) References Cited

U.S. PATENT DOCUMENTS

| 13,468 | A | 8/1855 | Mathews, Jr. |
|---|---|---|---|
| 18,129 | A | 9/1857 | Ashcroft |
| 974,081 | A | 10/1910 | Kronenberg |
| 1,288,886 | A | 12/1918 | Helm |
| 1,345,630 | A | 7/1920 | Place |
| 1,416,814 | A | 5/1922 | Glickerman |
| 1,421,501 | A | 7/1922 | Kraft et al. |
| 1,444,099 | A | 2/1923 | Berry |
| 1,536,478 | A | 5/1925 | Crocker |
| 1,537,338 | A | 5/1925 | Deverall |
| 1,664,776 | A | 3/1928 | Heise |
| 1,874,765 | A | 8/1932 | Lammedee |
| 2,116,628 | A | 5/1938 | Heise ............................ 73/109 |
| 2,181,730 | A | 11/1939 | Heise ............................ 285/166 |
| 2,378,201 | A | 6/1945 | Dewan ........................ 73/414 |
| 2,565,526 | A | 8/1951 | Seitz ............................ 73/388 |
| 2,693,896 | A | 11/1954 | Brown ........................ 220/44 |
| 2,701,968 | A | 2/1955 | Brown |
| 2,712,240 | A | 7/1955 | Booth .......................... 73/418 |
| 2,796,765 | A | 6/1957 | Huston |
| 3,175,531 | A | 3/1965 | Du Bois ...................... 116/129 |
| 3,214,979 | A | 11/1965 | Bissell et al. ................ 73/418 |
| 3,277,722 | A | 10/1966 | Huston ........................ 73/418 |
| 3,335,609 | A | 8/1967 | Nelson |
| 3,398,584 | A | 8/1968 | Heise .......................... 73/418 |
| 3,549,043 | A | 12/1970 | Waite .......................... 220/82 |

(List continued on next page.)

FOREIGN PATENT DOCUMENTS

| CA | 974081 | 9/1975 |
|---|---|---|
| JP | 58-160314 | 10/1983 |
| JP | 60-31643 | 3/1985 |
| JP | 3-109172 | 11/1991 |
| JP | 51-88239 | 7/1993 |

OTHER PUBLICATIONS

Ashcroft Palmer–Wahl; *Fearless* pressure gauge advertisement; ISA Show, New Orleans; at least as early as Aug. 2000.

*Primary Examiner*—Edward Lefkowitz
*Assistant Examiner*—Alandra Ellington
(74) *Attorney, Agent, or Firm*—Fish & Richardson P.C.

(57) ABSTRACT

A dampening apparatus for a pressure gauge in which a housing secured to the amplifier of the pressure gauge encircles the pointer shaft in a close but loose fit relation so as to define a controlled clearance packed with a high viscosity dampening agent such that it serves to decelerate and cushion any sudden shock or pulsation force that would otherwise be transmitted from the pointer shaft to a pointer registering values of pressure of fluid pressure being monitored.

10 Claims, 2 Drawing Sheets

U.S. PATENT DOCUMENTS

| | | | | |
|---|---|---|---|---|
| 3,555,909 | A | 1/1971 | Harrah | 73/411 |
| 3,596,509 | A | 8/1971 | Raffaelli | 73/146.3 |
| 3,603,151 | A | 9/1971 | Zurstadt | 73/368.6 |
| 3,630,089 | A | 12/1971 | Bissell | 73/431 |
| 3,633,535 | A | 1/1972 | Puster | 116/129 |
| 3,641,820 | A | 2/1972 | Bissell | 73/418 |
| 3,661,027 | A | 5/1972 | Gattesco | 74/411 |
| 3,765,249 | A | 10/1973 | Bissell | 73/431 |
| 3,765,448 | A | 10/1973 | Dussia | 137/553 |
| 3,803,918 | A | 4/1974 | Blough, Jr. | 73/420 |
| 3,807,232 | A | 4/1974 | Wetterhorn | |
| 3,922,919 | A | 12/1975 | Schulze et al. | 73/418 |
| 3,975,967 | A | 8/1976 | Conti | 73/411 |
| 4,051,730 | A | 10/1977 | Andrews et al. | 73/416 |
| 4,055,085 | A * | 10/1977 | Wetterhorn | 73/418 |
| 4,100,812 | A | 7/1978 | Gray et al. | 73/732 |
| 4,109,537 | A | 8/1978 | Gorgens et al. | 73/756 |
| 4,148,123 | A | 4/1979 | Neubeck et al. | 29/407 |
| 4,161,888 | A | 7/1979 | Bissell | 73/740 |
| 4,168,631 | A | 9/1979 | Wetterhorn et al. | 73/741 |
| 4,237,738 | A | 12/1980 | Wetterhorn | 73/740 |
| 4,240,298 | A | 12/1980 | Wetterhorn | 73/732 |
| 4,246,796 | A | 1/1981 | Wetterhorn | 73/732 |
| 4,299,253 | A | 11/1981 | Burton | |
| 4,337,664 | A | 7/1982 | Kipp et al. | 73/741 |
| 4,361,046 | A | 11/1982 | Wetterhorn et al. | 73/711 |
| 4,413,523 | A | 11/1983 | Claxton et al. | 73/701 |
| 4,413,524 | A | 11/1983 | Kosh | 73/707 |
| 4,444,057 | A | 4/1984 | Wetterhorn | 73/739 |
| 4,485,676 | A | 12/1984 | Wilson | 73/741 |
| 4,488,341 | A | 12/1984 | Scott et al. | 29/156.4 |
| 4,501,152 | A | 2/1985 | Wetterhorn et al. | 73/738 |
| 4,502,334 | A | 3/1985 | Gorgens et al. | 73/705 |
| 4,528,755 | A | 7/1985 | Kanda et al. | 33/172 |
| 4,542,654 | A | 9/1985 | Wilson et al. | 73/741 |
| 4,545,256 | A | 10/1985 | Ferguson | 73/738 |
| 4,552,389 | A | 11/1985 | Babuder et al. | 285/379 |
| 4,753,112 | A | 6/1988 | Wetterhorn et al. | 73/431 |
| 4,939,338 | A | 7/1990 | Bregy et al. | 219/137 |
| 5,000,049 | A | 3/1991 | Cooper et al. | 73/730 |
| 5,067,100 | A | 11/1991 | Bissell et al. | 364/571.01 |
| 5,095,266 | A | 3/1992 | Ohike et al. | 324/146 |
| 5,181,422 | A | 1/1993 | Leonard et al. | 73/715 |
| 5,345,400 | A | 9/1994 | Bissell et al. | 364/571.01 |
| 5,416,475 | A | 5/1995 | Tolbert et al. | 340/870.02 |
| 5,437,066 | A | 8/1995 | Mills et al. | 4/661 |
| 5,481,921 | A | 1/1996 | Carpenter et al. | 73/743 |
| 5,567,883 | A | 10/1996 | Nara | 73/741 |
| 5,591,918 | A | 1/1997 | Ferguson | 73/732 |
| 5,597,276 | A | 1/1997 | Yokell | 409/132 |
| 5,644,074 | A | 7/1997 | Huang | 73/146 |
| 5,650,566 | A | 7/1997 | Chou | 73/431 |
| 5,913,447 | A | 6/1999 | Carpenter | 220/664 |
| 5,952,579 | A | 9/1999 | DeFrancesco et al. | 73/743 |
| 5,970,796 | A | 10/1999 | Blake et al. | 73/715 |
| 6,085,595 | A | 7/2000 | Ferguson | 73/730 |
| 6,119,525 | A * | 9/2000 | Hamma | 73/739 |
| 6,164,138 | A | 12/2000 | Blake et al. | 73/732 |
| 6,295,876 | B1 | 10/2001 | Busch | 73/740 |

* cited by examiner

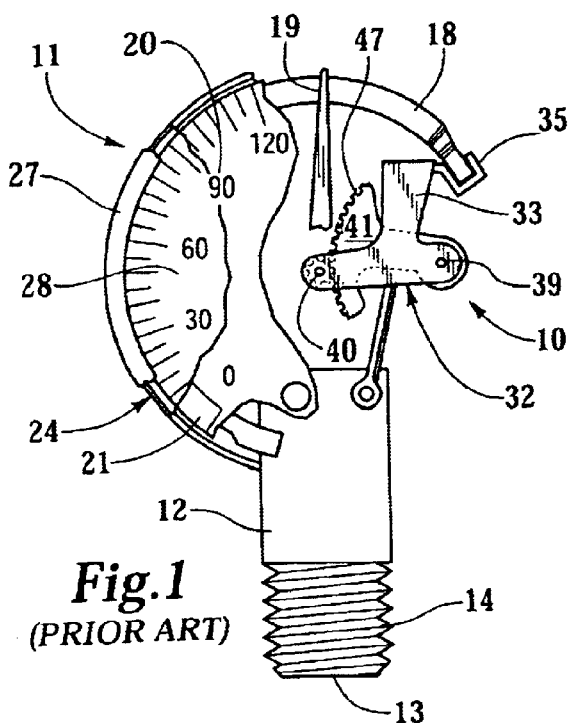
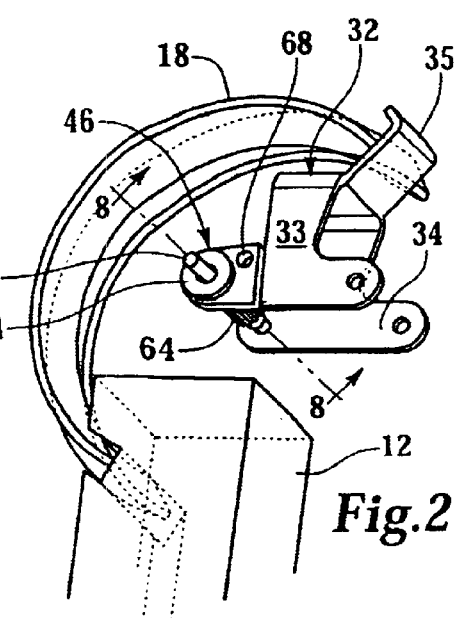
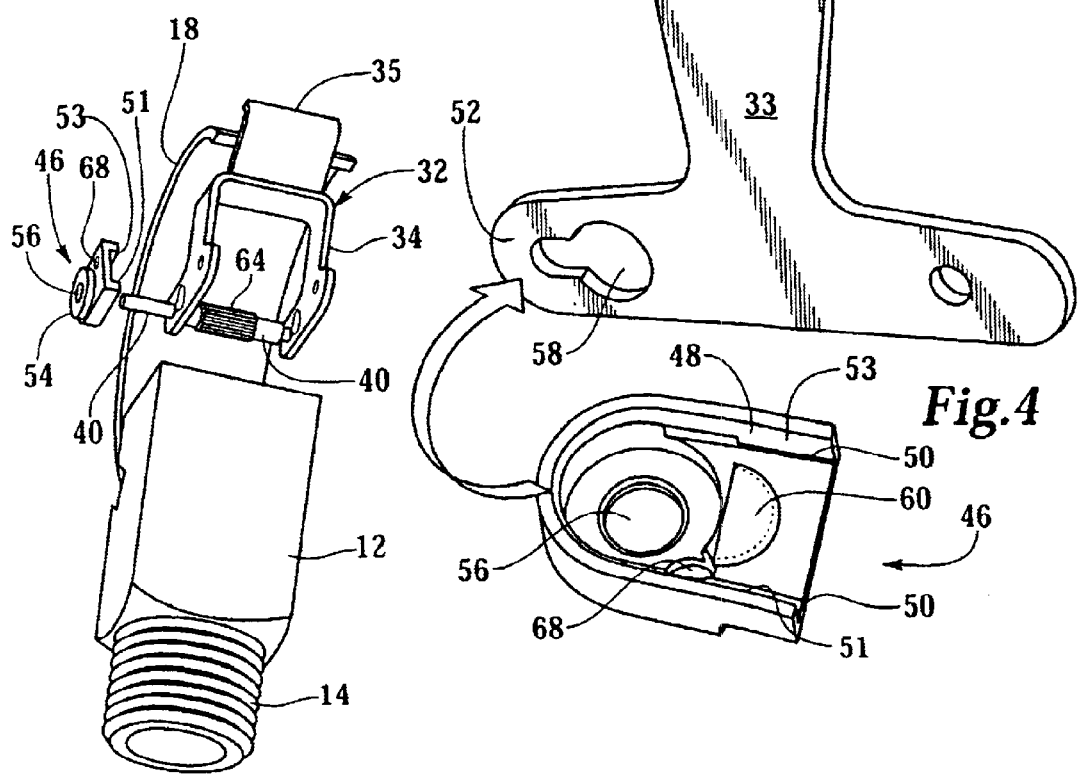
Fig.1 (PRIOR ART)
Fig.2
Fig.3
Fig.4

PRESSURE GAUGE HAVING A DAMPENER MECHANISM WITH ATTACHABLE HOUSING

This application is a continuation-in-part of pending application Ser. No. 09/589,377, filed Jun. 7, 2000 which is a continuation-in-part of application Ser. No. 09/080,071, filed May 15, 1998, now U.S. Pat. No. 6,119,525.

FIELD OF THE INVENTION

The field of art to which the invention pertains comprises pressure gauges having a dampener operative to avoid transmitting shock pulsation or vibration forces from the condition sensitive element to the output indicia.

BACKGROUND OF THE INVENTION

Pressure gauges are widely utilized in a myriad of different environments for commercial and industrial applications where measuring and indication of fluid pressure values are required. Values of pressure are usually displayed by a pointer in analog form. The primary sensing element of the gauge typically comprises a Bourdon tube having a free end that incurs a predictable displacement in response to pressure changes to which it is exposed. Typically, tube displacement is translated via a movement or amplifier to a rotatable pointer that is displaced opposite a dial of calibrated pressure values.

The gauge movement impresses the extent of tube deflection upon the indicator element which registers the value of force, pressure or condition. For accurate measurement, the responsive element must not only be sensitive to very small changes in value of the forces of pressures measured, but the deflection of the condition responsive element in response to such changes must be sufficiently minute that the indicator will legibly register a precise change in value. Accordingly, when the force or pressure to be measured is subject to rapid or violent pulsations, it can cause the gauge movement and indicator to vibrate or fluctuate. Under these conditions it is very difficult to measure accurately the average mean or peak value of the source as a result of the pulsations being impressed on the condition responsive element. Such vibration makes reading of the gauge difficult and may even cause misalignment of parts, thereby necessitating frequent readjustment. Moreover, it tends to result in excessive strain and wear on the gauge elements, thereby reducing the expectant life of the gauge.

BACKGROUND OF THE PRIOR ART

The use of dampeners in gauges are well known as exemplified by the disclosures of U.S. Pat. Nos. 1,664,776; 1,874,765; 2,701,968; 2,796,765 3,335,609; 4,100,812 and 4,413,523. Thus, while various constructions of gauge dampeners are known, they tend to be of a relatively complex construction and therefore relatively costly. Another approach has been to liquid fill the case, but this has proven to be expensive, heavy and troublesome with associated leakage and disposal problems.

Despite recognition of the foregoing, a much simpler and more economically feasible construction of gauge dampener has heretofore been unknown.

OBJECTS OF THE INVENTION

It is an object of the invention to provide a novel dampener construction for gauges to dampen undesirable vibration fluctuation forces internally imposed on the gauge.

It is a further object of the invention to effect the previous object with a construction that is economically advantageous compared with previous constructions utilized for that purpose.

It is a still further object of the invention to effect the previous objects with a dampener that functions in a highly efficient manner and yet is substantially maintenance free.

SUMMARY OF THE INVENTION

This invention relates to pressure gauge apparatus including novel dampener apparatus for eliminating the adverse effects of pulsation, and vibration forces, and the like received by the gauge. More specifically, the invention relates to such a dampener in a pressure gauge that is operative to absorb shock pulsation or vibration forces against being transmitted from the output of the condition responsive element to the output indicia of the gauge, commonly in the form of a pointer opposite a dial plate.

The foregoing is achieved in accordance herewith by means of a one piece housing that snap fits onto the lower tail-like end of an amplifier side leg. A side aperture in the housing furthest removed from the leg face enables the pointer shaft to transversely extend through and beyond the housing to support the dial pointer. Internally, the housing defines a central cavity functioning as a reservoir in which to contain an engineered dampening agent (EDM) as will be described. The housing is relatively small in size having a total height dimension of about 0.90 inches. The housing aperture defines a clearance of the pointer shaft of about 0.010 inches so as to afford a controlled clearance fit thereabout. The cavity reservoir within the housing has a diameter of about 0.160 inches and a lateral depth of about 0.070 inches. The engineered dampener agent is characterized preferably by a viscosity range of an oil from about 1 million centistokes to a grease consistency number of 144 per ASTM D 1403 (¼ scale cone penetration test). Optimum consistency is about number 190.

Any surrounding structures about the pointer shaft afford outside clearance of between about 0.009 inches–0.051 inches with an optimum of about 0.017 inches that is similarly packed with the dampener agent.

By virtue of a relatively simple construction, satisfactory dampening in a pressure gauge can be obtained without the structural complexity normally associated with dampener constructions of the prior art.

The above noted features and advantages of the invention as well as other superior aspects thereof will be further appreciated by those skilled in the art upon reading the detailed description that follows in conjunction with the drawings.

BRIEF DESCRIPTION OF THE DRAWINGS

FIG. 1 is a front elevation of a pressure gauge of the prior art;

FIG. 2 is a fragmentary upside isometric view illustrating the dampener apparatus of the instant invention;

FIG. 3 is a partially exploded fragmentary front side isometric view of the dampener apparatus hereof;

FIG. 4 is an exploded isometric view of the dampener housing assembly per se;

DESCRIPTION OF THE PREFERRED EMBODIMENT

Figure 5:
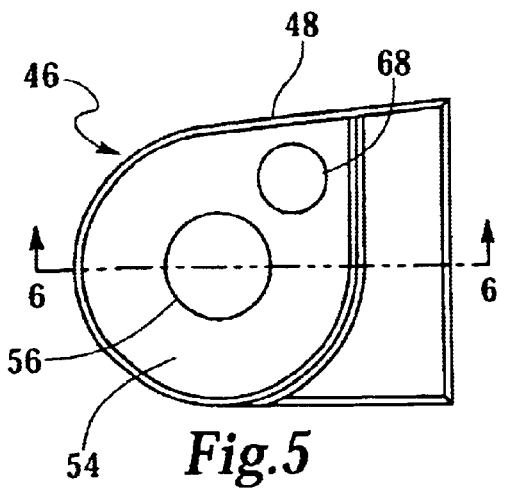
FIG. 5 is a front side elevation of the dampener housing.

In the description which follows, like parts are marked throughout the specification and drawings with the same reference numerals respectively. The drawing figures are not necessarily to scale and in certain views, parts may have been exaggerated for purposes of clarity.

Referring now to the drawings, there is illustrated in FIG. 1 a pressure gauge designated 11 that may for example, be of a type disclosed in U.S. Pat. No. 4,055,085 incorporated herein by reference. The instrument includes an amplifier 10, a stem or socket 12 in which fluid pressure to be monitored is received at an inlet 13 and includes threads 14 for connecting the gauge to a system with which it is to be employed. Fluid pressure received at inlet 13 is communicated to a Bourdon tube 18 that is subject to arcuate motion displacement in a well known manner in response to incremental pressure changes received at inlet 13.

The motion of Bourdon tube 18 is conducted to amplifier 10 to produce an amplified and correlated motion for operating a pointer 19 relative to pressure values 20 on dial face 21. Except for stem 12, each of the foregoing components comprise the operating mechanism that is substantially contained within enclosed gauge housing 24. The gauge housing consists of a cup shape shell-like backing secured via screws to stem 12 and bezel 27 telescopically fit onto the backing to secure a crystal 28 for viewing the pointer position relative to pressure values 20 on face 21.

Amplifier 10, includes a centrally upright U-shaped carriage or frame 32 integrally formed to include symmetrically spaced apart side legs 33 and 34. Frame 32 is preferably of a hard metal such as brass and of a relatively thin cross section. Bracket 35 is permanently secured to the end of the Bourdon tube as by welding, soldering, brazing or the like.

Installed between carriage legs 33 and 34 are a pair of longitudinally displaced rotatable shafts 39 and 40. Shaft 39 provides a hinge support for a geared sector arm 41 secured thereto as by staking while shaft 40 represents the output drive shaft supporting pointer 19. Rotation of shaft 40 for positioning pointer 19 is effected by pinion 64 secured thereto and meshing with sector gearing 47 of arm 41.

Figure 7:
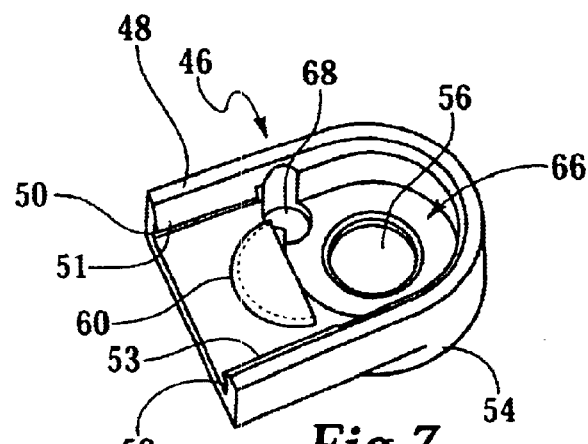
FIG. 7 is an interior isometric view of the dampener housing.
Figure 6:
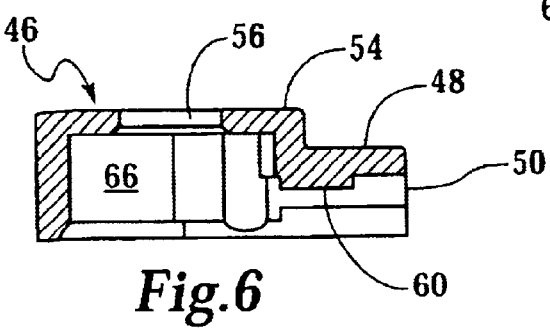
FIG. 6 is a sectional view as seen substantially along the lines 6—6 of FIG. 5.
Figure 8:
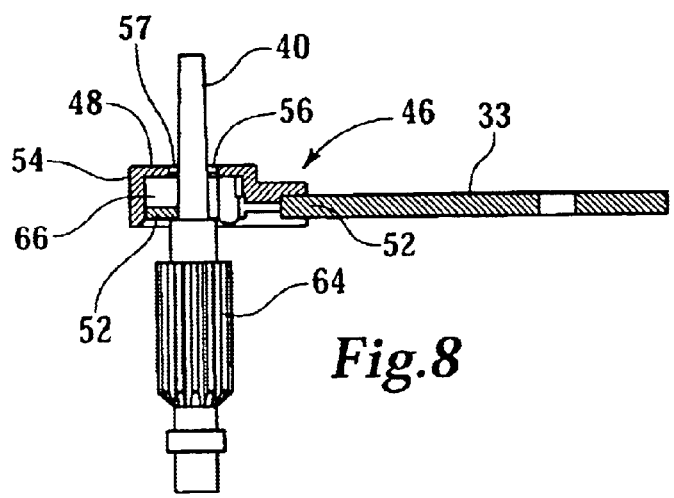
FIG. 8 is a sectional view as seen substantially along the lines 8—8 of FIG. 2.

To effect dampening in accordance herewith in order to offset any sudden shock, pulsation or vibration forces as might otherwise be transmitted from the Bourdon tube 18 to pointer 19, there is provided in accordance with the invention hereof a dampener, designated 46, as best seen in FIGS. 2–8.

Dampener 46 is comprised of a die-cast housing 48 which at its underside defines an inlet groove 50 beneath opposite side lips 51 and 53. The groove is adapted to receive the lower tail end 52 of amplifier side leg 33 for slidable or snap on placement thereon. Integrally formed on a front face of the housing is an annular concentric boss 54 that includes an aperture 56 to receive the extension of pointer shaft 40 to define a clearance 57 between the pointer shaft 40 and the aperture 56. For these purposes, aperture 56 when housing 48 is properly positioned on tail end 52 is axially coincident with the location of key-shaped aperture 58 in housing leg 33. The underside of groove 50 includes a locating bump 60 to enable correct positioning of housing. Defined within the housing 48 is a cavity 66 serving as a reservoir in which a predetermined quantity of dampening agent can be contained and supplied via aperture 68.

By the above description there is disclosed a novel and simple construction for dampening the adverse effects of imposed shock or vibration that might otherwise cause fluctuations in the positioning of pointer 19. By a relatively simple and expedient construction comprising the simplest of components, an otherwise adverse problem encountered in the operation of such pressure gauges is readily and inexpensively overcome. It is especially worthy to note that the reservoir retains the EDM that remains in intimate contact with the pointer shaft and avoids migration that might otherwise occur.

As many changes could be made in the above construction and many apparently widely differ embodiments of this invention could be made without departing from the scope thereof, it is intended that all matter contained in the drawings and specification shall be interpretated as illustrative and not in a limiting sense.

What is claimed is:

1. In a pressure gauge including a fluid inlet at which to receive fluid of which the value of pressure is to be monitored, a pressure sensitive Bourdon tube responsive to changes in pressure values of fluid received at said inlet and a pointer indicator supported on an arcuately displaceable pointer shaft and operative by said Bourdon tube for providing indicia of the value of pressure being received, an amplifier operatively intervening between the output of said Bourdon tube and the input to said pointer shaft and a dampener for suppressing undesirable vibration force in the received fluid from being transmitted to said pointer indicator, said dampener comprising:

a dampener housing secured to said amplifier in a stationary relation to said amplifier and having an exterior wall defining an aperture through which to receive a portion of said pointer shaft extending transversely beyond said housing with a clearance therebetween;

a housing reservoir defined by said housing and said amplifier in communication with said aperture and said clearance; and a packing of dampener agent of predetermined viscosity contained in said reservoir in communication with said clearance for effecting a cushioning layer of a dampener agent therebetween.

2. In a pressure gauge in accordance with claim 1 in which said dampener housing is secured to the amplifier such that the aperture of said housing and the axis of said pointer shaft are substantially coaxially aligned and the dampener housing lies in a plane generally parallel with a plane in which the amplifier moves.

3. In a pressure gauge in accordance with claim 1 in which said amplifier includes a side leg and said housing reservoir defines a cavity which is openly exposed to said side leg and an underside of said dampener housing includes spaced apart lips for effecting an attachment of said dampener housing onto said side leg.

4. In a pressure gauge in accordance with claim 1 in which said amplifier includes a side leg and an underside of said dampener housing includes a location feature for positioning said dampener housing relative to the side leg.

5. In a pressure gauge in accordance with claim 4 in which the exterior wall of said dampener housing includes a second aperture through which said dampening agent can be added to said housing reservoir.

6. In a pressure gauge in accordance with claim 1 in which said amplifier includes a side leg through which the pointer shaft extends and said dampener housing is secured to said leg for effecting a coaxial alignment between the aperture and the axis of the pointer shaft.

7. In a pressure gauge in accordance with claim 6 in which said housing reservoir comprises a cavity which is openly exposed to said side leg and an underside of said dampener housing includes spaced apart parallel lips for effecting a snap-on attachment of said dampener housing onto said side leg.

8. In a pressure gauge in accordance with claim 7 in which the underside of said dampener housing also includes a location feature for positioning said dampener housing relative to the side leg.

9. In a pressure gauge in accordance with claim 7 in which the exterior wall of said dampener housing includes a second aperture through which said dampening agent can be added to said housing reservoir.

10. In a pressure gauge in accordance with claim 8 in which the exterior wall of said dampener housing includes a second aperture through which said dampening agent can be added to said housing reservoir.

* * * * *